United States Patent [19]

Gavagan

[11] Patent Number: 4,821,374
[45] Date of Patent: Apr. 18, 1989

[54] HINGE ASSEMBLY FOR VEHICLE VISOR AND OTHER VEHICLE ACCESSORIES

[75] Inventor: James A. Gavagan, Center Line, Mich.

[73] Assignee: Irvin Industries, Inc., Rochester Hills, Mich.

[21] Appl. No.: 30,390

[22] Filed: Mar. 26, 1987

[51] Int. Cl.$^4$ .............................................. E05D 11/08
[52] U.S. Cl. ....................................... 16/321; 16/342; 16/376; 16/379; 16/381; 16/386; 296/97.9
[58] Field of Search ................ 16/300, 321, 331, 337, 16/342, 375, 376, 378, 379, 381, 386; 296/97 K

[56] References Cited

U.S. PATENT DOCUMENTS

| | | |
|---|---|---|
| 876,039 | 1/1908 | Burrell . |
| 1,530,162 | 3/1925 | Foreman . |
| 1,576,793 | 3/1926 | Sadler . |
| 1,905,868 | 4/1933 | Hein . |
| 2,123,319 | 7/1938 | Thompson . |
| 2,148,557 | 2/1939 | Hook . |
| 2,201,377 | 5/1940 | Schoenheit .................. 296/97 K |
| 2,268,189 | 12/1941 | Colbert . |
| 2,304,223 | 12/1942 | Westrope ........................ 16/342 |
| 2,360,183 | 10/1944 | Westrope ..................... 296/97 K |
| 2,466,454 | 4/1949 | Logan . |
| 2,506,689 | 5/1950 | Simpson et al. . |
| 2,640,909 | 6/1953 | Montgomery . |
| 2,844,200 | 7/1958 | Herr et al. . |
| 3,211,903 | 10/1965 | McElreath . |
| 3,305,679 | 2/1967 | Barcita-Peruchena . |
| 3,375,364 | 3/1968 | Marcus . |
| 3,542,416 | 11/1970 | Nelson . |
| 3,576,409 | 4/1971 | Fiddler . |
| 3,610,680 | 10/1971 | Brady . |
| 3,641,334 | 2/1972 | Kipping . |
| 3,751,106 | 8/1973 | Mahler et al. . |
| 3,794,828 | 2/1974 | Arpino . |
| 3,871,703 | 3/1975 | Accatino . |
| 3,926,470 | 12/1975 | Marcus . |
| 4,070,054 | 1/1978 | Cziptschirsch .............. 296/97 K |
| 4,075,468 | 2/1978 | Marcus . |
| 4,500,131 | 2/1985 | Fleming ....................... 296/97 K |
| 4,582,356 | 4/1986 | Kaiser et al. ............... 296/97 K |
| 4,617,699 | 10/1986 | Nakamura .................. 296/97 K |
| 4,626,019 | 12/1986 | Tung et al. ................. 296/97 K |
| 4,702,513 | 10/1987 | Ebert et al. ................ 296/97 K |
| 4,707,019 | 11/1987 | Ebert et al. ................ 296/97 K |

FOREIGN PATENT DOCUMENTS

| | | |
|---|---|---|
| 1032112 | 6/1958 | Fed. Rep. of Germany . |
| 2027386 | 12/1971 | Fed. Rep. of Germany . |
| 1143365 | 9/1957 | France . |
| 817159 | 7/1959 | United Kingdom . |
| 854938 | 11/1960 | United Kingdom . |
| 999331 | 7/1965 | United Kingdom . |
| 1043087 | 9/1966 | United Kingdom . |
| 1214327 | 12/1970 | United Kingdom . |
| 1588164 | 4/1981 | United Kingdom ......... 296/97 H |

*Primary Examiner*—Kuang Y. Lin
*Assistant Examiner*—Edward A. Brown
*Attorney, Agent, or Firm*—Harness, Dickey & Pierce

[57] ABSTRACT

A hinge assembly is disclosed which is particularly well suited for vehicle accessory application such as for vehicle sun visors for example. A hinge assembly according to the present invention includes a rod member interconnected with the vehicle interior or other fixed member. A generally hollow elongated sleeve member is interconnected with a movable member and is adapted for longitudinally receiving the rod member for relative rotation therewithin. A resilient biasing member, which is preferably a leaf-type spring, is received within the sleeve member for resiliently biasing the rod member laterally against the interior surface of the sleeve member in order to provide a frictional relative rotational engagement between the rod member and the sleeve member. The leaf spring, the rod member, and the sleeve member in preferred embodiments of the present invention are configured and arranged to provide detented positions at predetermined relative rotational orientations of the pivotally interconnected members, to which the movable member is self-propelled whenever it is rotated into relatively close rotational proximity with such predetermined pivoted orientations.

18 Claims, 4 Drawing Sheets

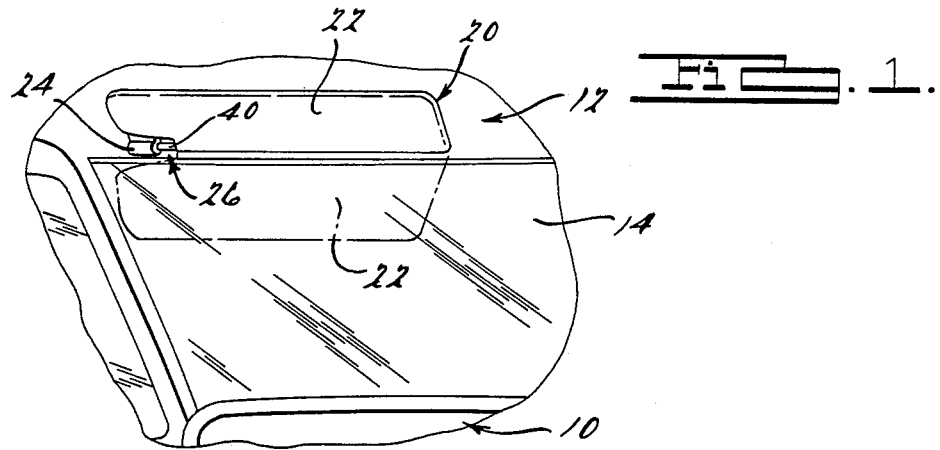
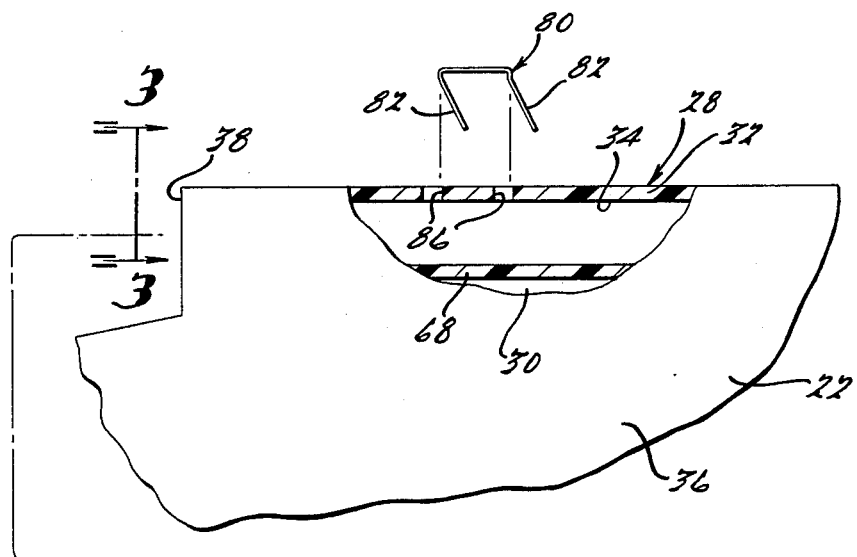
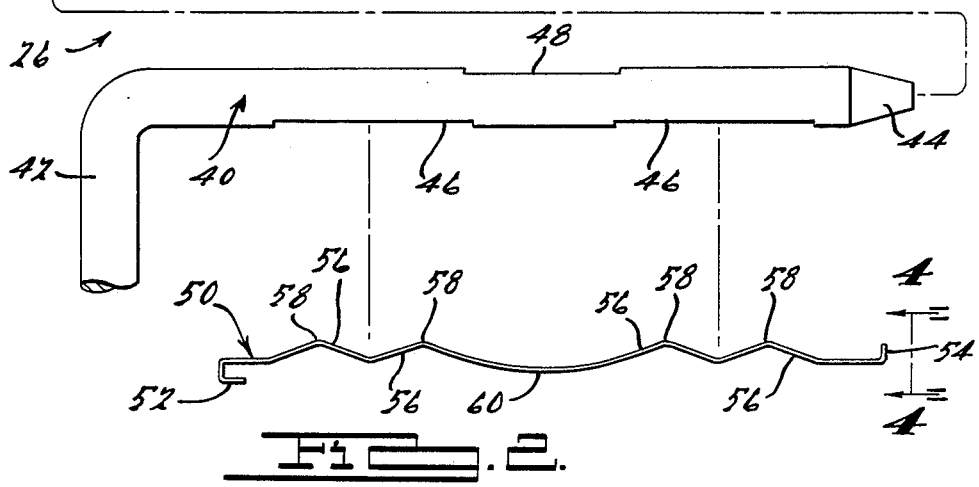

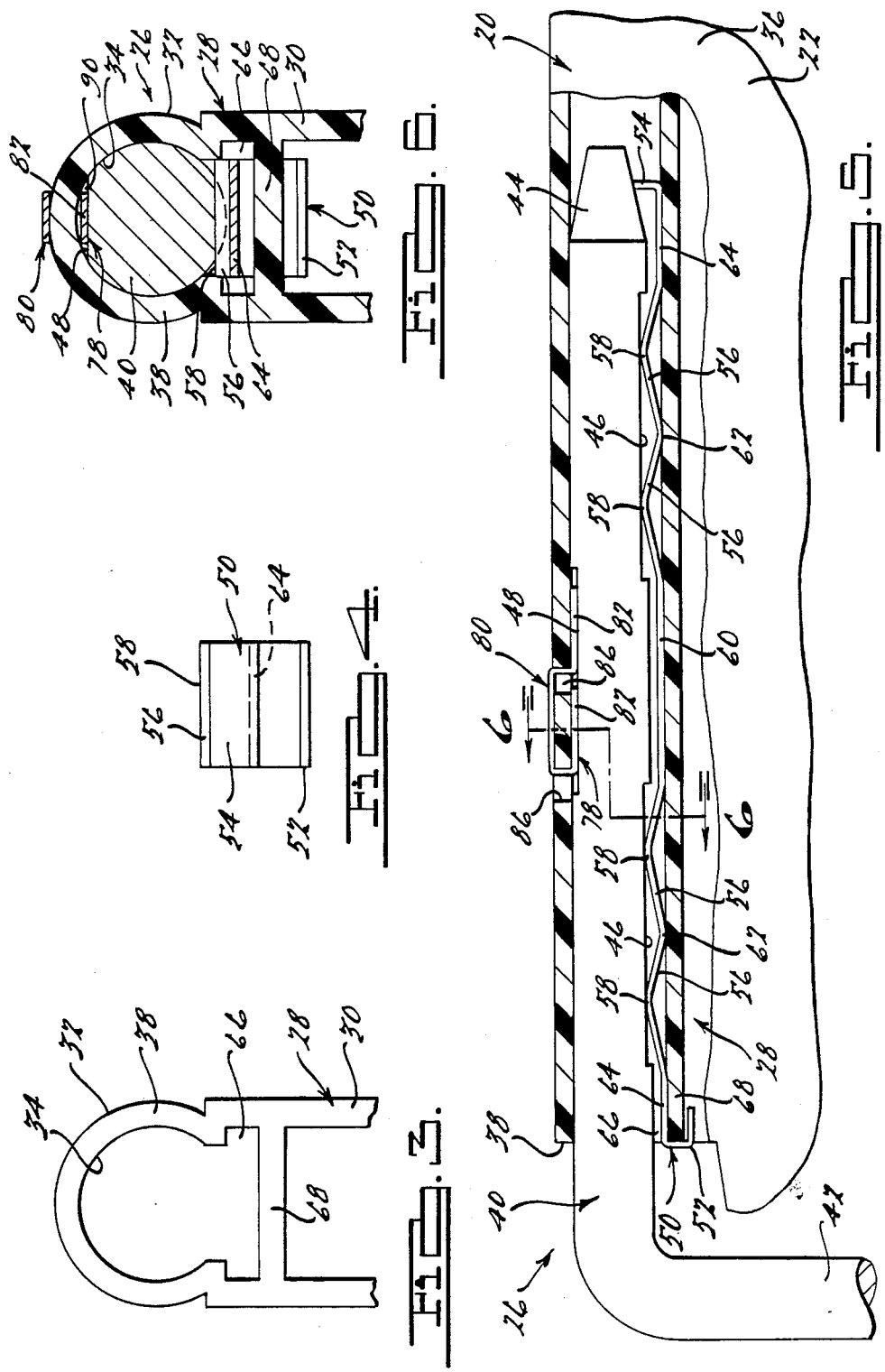

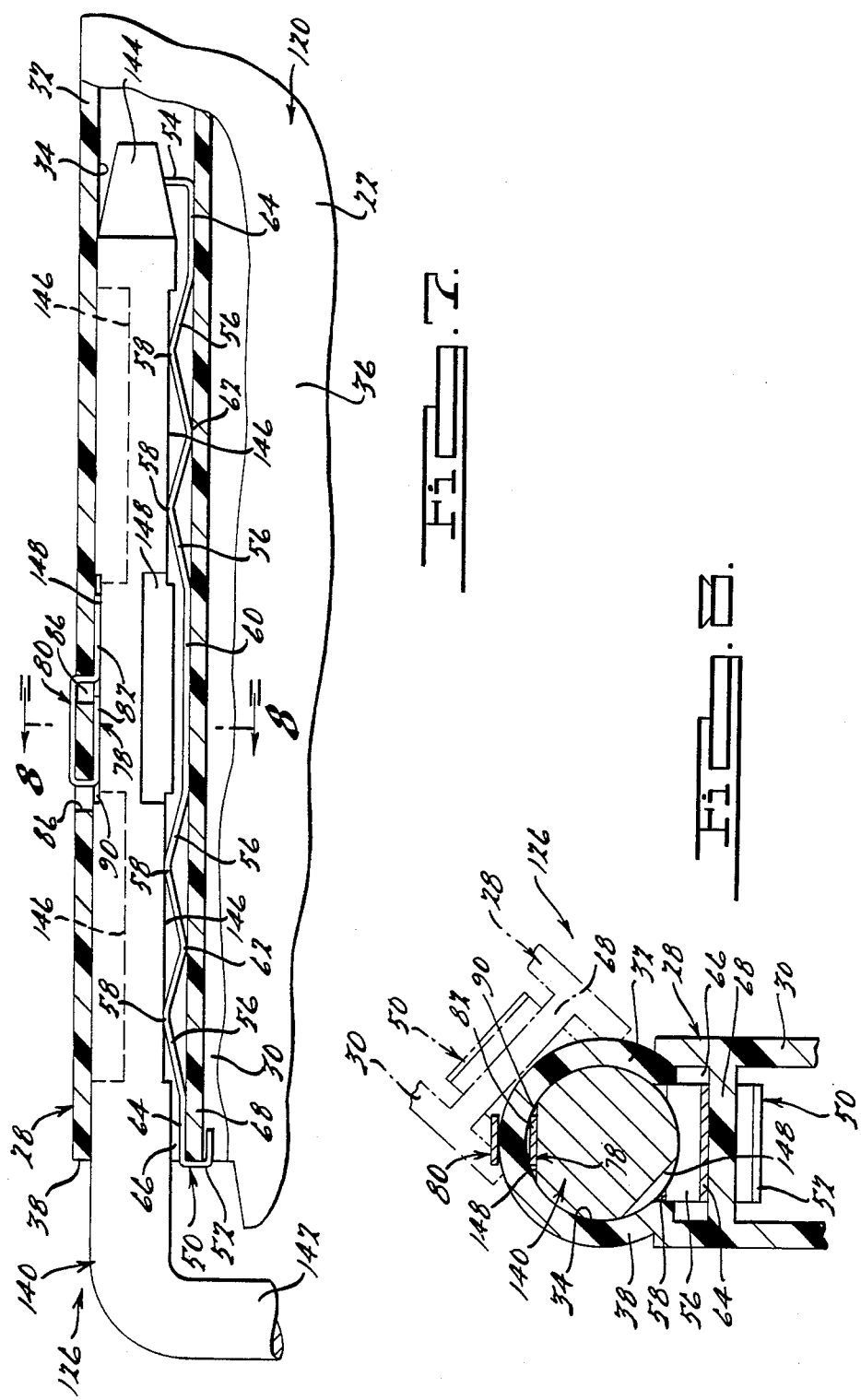

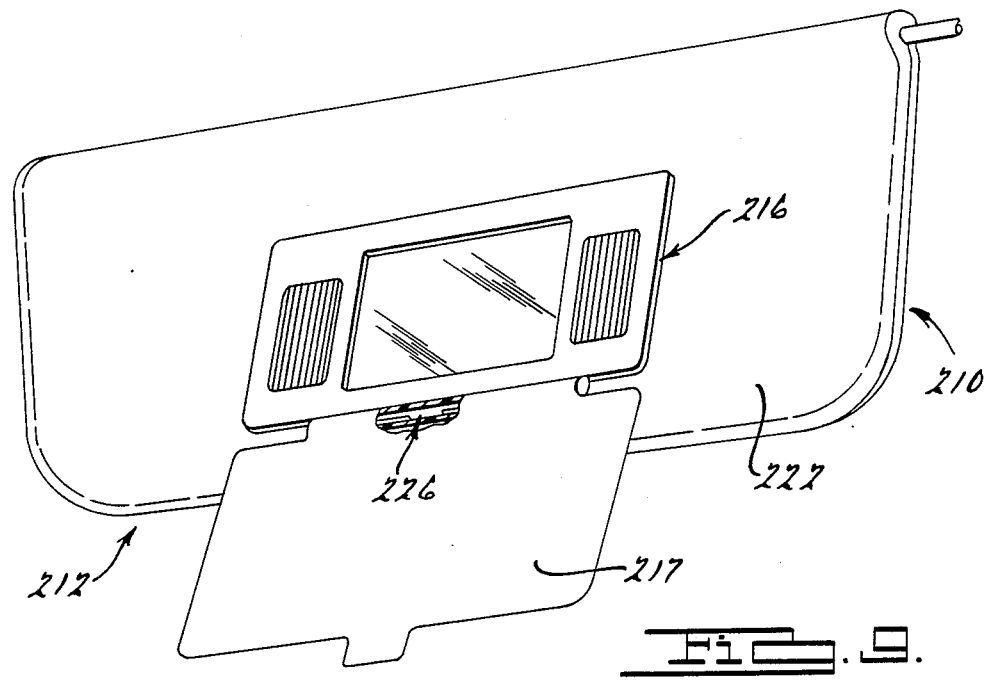
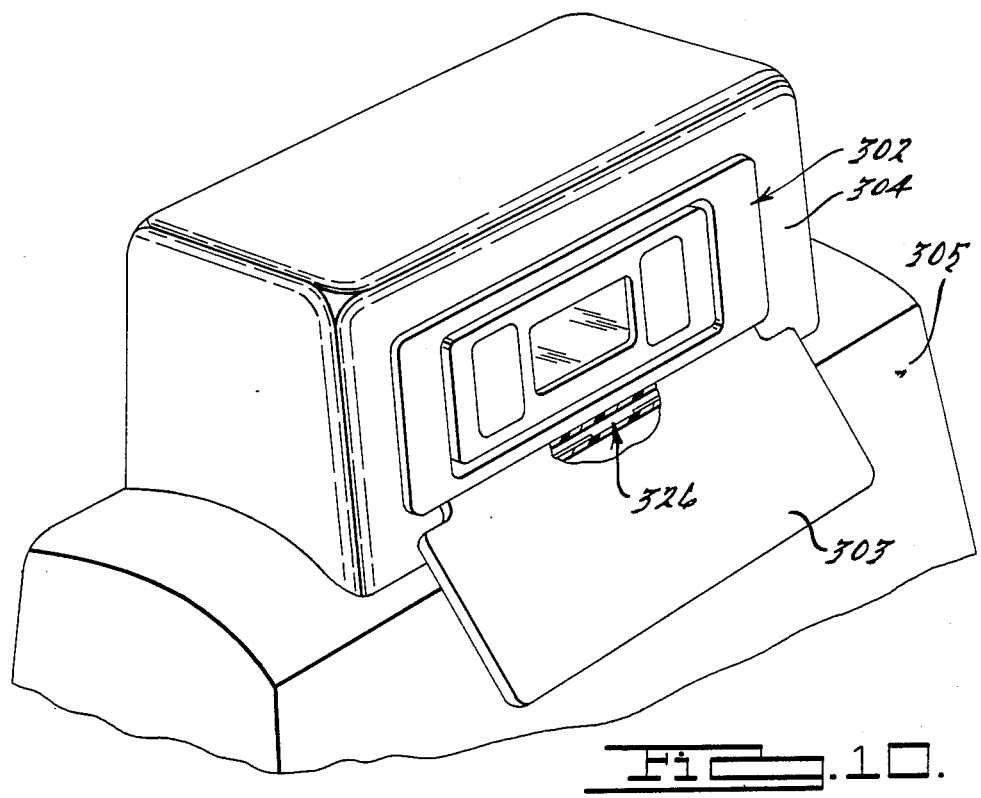

HINGE ASSEMBLY FOR VEHICLE VISOR AND OTHER VEHICLE ACCESSORIES

BACKGROUND AND SUMMARY OF THE INVENTION

The present invention relates generally to hinge assemblies for hinged or pivotally interconnected members, and more particularly to such hinge assemblies especially adapted for pivotally interconnecting a sun visor with the interior of a vehicle. Hinge assemblies according to the present invention are also applicable for pivotally mounting other vehicle accessories, such as vanity doors, storage compartment doors, or other accessories or accessory covers. The various embodiments of the hinge assembly according to the present invention can also be employed for various non-vehicular uses, as will be appreciated by one skilled in the art.

The typical vehicle includes a wide variety of hinged or pivotally mounted vehicle accessories or accessory covers in the interior, luggage storage areas, or engine compartment. In the past, however, many hinge assemblies for such vehicular applications, as well as for various non-vehicular applications, either have not been sufficiently durable or have been expensive to produce and install. Furthermore, many of such prior hinge assemblies have been found to be inordinately bulky, unsightly, or ill-fitting, all of which detract from the user's perception of quality with regard to the vehicle or other device in which such hinge assemblies are included.

In addition to the above disadvantages, many of the prior hinge assemblies have not provided the user with a wide variety of relatively rotated or pivoted positions in which the hinged members can be held and maintained, especially after extended use and wear of the hinge components. The need has therefore arisen for a hinge assembly of the type described above, which is simple and inexpensive to produce, assemble and install, that is highly durable, and that is capable of maintaining the hinged members in a wide variety of relative rotational or pivotal orientations.

According to the present invention, a hinge assembly according to the present invention is adapted for pivotally interconnecting a first member, such as a vehicle interior, with a second member, such as a sun visor or other vehicle accessory or accessory cover. The hinge assembly according to the present invention, includes an elongated rod member that is interconnected with the first member and longitudinally received within a generally hollow elongated sleeve member interconnected with the second member. The rod member is relatively rotatable within the sleeve member, and the hinge assembly includes a resilient biasing member within the sleeve member for resiliently biasing the rod member laterally against the interior of the sleeve member. Such resilient biasing force provides for a frictional relative rotational engagement between the rod member and the sleeve member. The resilient biasing member, which is preferably a longitudinally-extending leaf-type spring, is restrained from relative rotational movement within the sleeve member.

The preferred leaf spring of the hinge assembly according to the present invention includes at least one generally laterally-protruding discontinuity disposed along its length. Such discontinuity, which is preferably V-shaped in its longitudinal cross-section, is generally laterally and resiliently compressed between the rod member and the sleeve member interior surface in order to provide the above-mentioned biasing force and frictional relative rotational engagement between the rod member and the interior surface of the sleeve member. Preferably a number of such discontinuities engage a corresponding number of recessed flat portions of the rod member.

Because the spring discontinuities are resiliently compressed between the rod member and the interior surface of the sleeve member to a lesser degree when the discontinuities engage the recessed flat rod portions than when they engage non-recessed portions of the rod member, the resilient mutual engagement of the discontinuities with the flat rod portions results in a detent at a predetermined orientation in the relative rotation of the rod member in the sleeve member. Furthermore, the movable hinged component, such as the sun visor in one preferred application of the present invention, is resiliently urged and substantially self-propelled into the above-mentioned predetermined relative rotational orientation whenever the hinged components are moved to a second predetermined relative rotational orientation in close proximity with the first predetermined relative rotational orientation mentioned above.

In preferred embodiments of the present invention, the detent and self-propelling effects discussed above are further enhanced by the provision of at least one generally flat sleeve portion on the interior surface of the sleeve member. Such flat sleeve portion is generally aligned longitudinally with still another generally flat and recessed rod portion disposed for engagement with the flat sleeve portion when the rod member is in the first predetermined relative rotational orientation in the sleeve member. Such flat sleeve portion is preferably defined by one or more generally flat tab members at a fixed location on the interior surface of the sleeve member.

It should be noted that in various embodiments of the present invention, the above-discussed flat rod portions can be provided at a number of circumferentially or rotationally offset positions on the rod member in order to provide a corresponding number of detents and predetermined relative rotational orientations when engaging the spring discontinuities and flat sleeve portions.

Additional objects, advantages and features of the present invention will become apparent from the following description and appended claims, taken in conjunction with the accompanying drawings.

BRIEF DESCRIPTION OF THE DRAWINGS

FIG. 1 is a partial perspective view of the interior of a vehicle, illustrating a hinge assembly according to the present invention for pivotally interconnecting a sun visor with a headliner of the vehicle interior.

FIG. 2 is a partial exploded view of the hinge assembly of FIG. 1.

FIG. 3 is a partial end view of a sleeve member component of the hinge assembly shown in FIG. 2, taken generally along line 3—3 of FIG. 2.

FIG. 4 is an end view of a spring member of the hinge assembly of FIG. 2, taken generally along line 4—4 of FIG. 2.

FIG. 5 is a partial longitudinal cross-sectional view of the hinge assembly of FIG. 1 and 2, illustrated in an assembled condition.

FIG. 6 is a partial cross-sectional view taken generally along line 6—6 of FIG. 5.

FIG. 7 is a partial longitudinal cross-sectional view similar to that of FIG. 5, but illustrating another embodiment of a hinge assembly according to the present invention.

FIG. 8 is a partial cross-sectional view taken generally along line 8—8 of FIG. 7.

FIG. 9 is a partial perspective view illustrating a hinge assembly according to the present invention for pivotally interconnecting a vanity door with a sun visor.

FIG. 10 is a partial perspective view illustrating still another embodiment of the present invention, wherein a hinge assembly according to the present invention for pivotally interconnecting a vanity or other vehicle accessory door with the rear side of a vehicle set head restraint.

DETAILED DESCRIPTION OF THE PREFERRED EMBODIMENTS

FIGS. 1 through 10 illustrate various embodiments of hinge assemblies according to the present invention, which are shown incorporated in a few merely exemplary vehicle interior applications. One skilled in the art will readily recognize from the discussion and drawings herein that the principles of the present invention are equally applicable to hinge assemblies other than those shown in FIGS. 1 through 10, as well as in other vehicular or non-vehicular applications.

In FIG. 1, a vehicle 10 includes an interior 12, defined in part by a windshield or window 14. A sun visor assembly 20 is included in the vehicle interior 12 and includes a visor 22 pivotally interconnected with the interior 12 by way of a mounting bracket 24 and a hinge assembly 26 according to the present invention.

As shown in FIGS. 2 through 6, the hinge assembly 26 includes a visor mounting member 28, which has a gripping portion 30 secured to the visor 22, a sleeve portion 32, and an interior sleeve surface 34. A decorative or padded covering 36 is typically provided on the visor 22 and also preferably covers the visor mounting member 28, in order to substantially conceal the hinge assembly 26.

An elongated rod 40 extends longitudinally through an outer end 38 of the sleeve portion 32 to be rotationally received within the sleeve portion 32. The elongated rod 40 includes an outer end 42, which is preferably angled and adapted to be secured to the vehicle interior 12 by way of the mounting bracket 24 in a manner well-known to those skilled in the art. The rod 40 also includes a preferably tapered inner end 44 disposed within the sleeve portion 32 to allow for ease of installation as is described below.

A resilient biasing member, which is preferably a leaf spring 50 as shown in the drawings, extends longitudinally within the sleeve portion 32 between the rod 40 and the interior surface 34 of the sleeve portion 32. The preferred leaf spring 50 includes an outer end 52 which is bent over to engage a generally flat base portion 68 of the visor mounting member 28 in order to rotationally anchor and restrain the leaf spring 50 within a cavity 66, thereby substantially preventing the leaf spring 50 from rotating within the sleeve portion 32. The leaf spring 50 also preferably includes an opposite inner end 54, which protrudes in a generally lateral direction in order to engage the above-mentioned tapered inner end 44 of the rod 40. Such a configuration allows the rod 40 to be easily and conveniently inserted into the sleeve portion 32, between the interior surface 34 and the leaf spring 50 during assembly of the hinge assembly 26. The tapered inner end 44 of the rod 40 also prevents the leaf spring 50 from sliding longitudinally outward within the cavity 66 of the sleeve portion 32.

The preferred leaf spring 50 includes one or more preferably V-shaped discontinuities 56 along its longitudinal length. The V-shaped discontinuities 56 have apexes 58 that protrude in a generally laterally inward direction to resiliently and frictionally engage the rod 40. The V-shaped discontinuities 56 are generally longitudinally aligned with a corresponding number of recessed, generally flat rod portions 46, which are circumferentially disposed on the rod 40 for mutual engagement with the V-shaped discontinuities 56 at a predetermined relative rotational orientation of the visor 22 and the sleeve portion 32 relative to the rod 40.

The leaf spring 50 preferably also includes an intermediate portion 60, a number of discontinuity intersections 62, and one or more flat portions 64, all of which abuttingly engage the base portion 68 of the sleeve portion 32 in order to laterally anchor or secure the V-shaped discontinuities 56 within the cavity 66. Such anchoring of the leaf spring 50, along with the frictional engagement of the apexes 58 with the rod 40, tends to produce a very uniform, predictable, and repeatable resilient biasing force for biasing the rod 40 against the interior surface 34 of the sleeve portion 32. Such resilient biasing force can be preselected by one skilled in the art by merely choosing the appropriate shape and configuration of the V-shaped discontinuities 56, the spring constant of the leaf spring 50, and the lateral size of the cavity 66, in order to provide a desired level of friction between the rod 40 and the sleeve portion 32. By predetermining such frictional effects, the hinge assembly 26 can be adapted to provide an infinite number of relative rotational orientations, at which the visor 22 can be pivotally rotated and maintained by the hinge assembly 26.

It should be noted that the V-shaped discontinuities 56 are resiliently compressed in a lateral direction to a lesser degree when engaging the flat rod portions 46 than when engaging non-recessed portions of the rod 40. This arrangement causes the leaf spring 50 to resiliently urge the visor 22 and the sleeve portion 32 into the above-mentioned predetermined relative rotational orientation whenever the visor 22 and the sleeve portion 32 are rotated to a relative rotational orientation that is in relatively close rotational proximity with the above-mentioned predetermined relative rotational orientation. Therefore, by preselecting the circumferential positions of the flat rod portions 46 on the rod 40, the visor 22 and the sleeve portion 32 can be caused to be self-propelled into a detent position at a predetermined, desired pivotal position of the visor 22 relative to the interior 12 of the vehicle 10. Such predetermined pivoted positions of the visor 22 can be selected to correspond with the positioning of the visor 22 against the headliner of the vehicle interior 12, or with other commonly or repeatedly used pivoted positions.

The sleeve portion 32 preferably has at least one flat sleeve portion 78 generally longitudinally aligned with one or more recessed flat rod portions 48. The recessed flat rod portion 48 provides a lateral clearance 90 with the remainder of the interior surface 34 of the sleeve portion 32, but engages the flat sleeve portion 78 when the visor 22 and the sleeve portion 32 are in a predetermined relative rotational orientation relative to the rod 40. Because of the generally flat mutual engagement of the flat sleeve portion 78 with the recessed flat rod portion 48 at such predetermined relative rotational orientation, the detent and self-propelling effects discussed above are further enhanced.

Preferably, the flat sleeve portion 78 is formed and defined by a clip 80 having one or more tab members 82 protruding through corresponding openings 86 in a sleeve portion 32 and bent over generally adjacent the interior surface 34. Such tab members 82 preferably extend in a longitudinally-inner direction from the openings 86 in order to facilitate the ease of insertion of the rod 40 into the sleeve portion 32 during assembly of the hinge assembly 26. Such tab members 82 also tend to restrain the rod 40 from longitudinally-outward movement within the sleeve portion 32, thereby contributing to the retention of the hinge assembly 26 in its assembled condition.

FIGS. 7 and 8 illustrate an alternate embodiment of the hinge assembly according to the present invention of FIGS. 1 through 6. Many of the components of the alternate hinge assembly 126 shown in FIGS. 7 and 8 are virtually identical to, or at least interchangeable with, corresponding components of the hinge assembly 26 shown in FIGS. 1 through 6. Therefore, such interchangeable components are indicated in FIGS. 7 and 8 with the same reference numerals as in FIGS. 1 through 6. Other components of the hinge assembly 126 shown in FIGS. 7 and 8 are similar to, and correspond with, certain components of the hinge assembly 26 shown for purposes of illustration in FIGS. 1 through 6. Such similar and corresponding components are indicated by reference numerals one hundred numerals higher than those of the corresponding components in FIGS. 1 through 6.

In the hinge assembly 126 shown in FIGS. 7 and 8, the rod 40 is replaced by a similar and corresponding elongated rod 140, which differs from the rod 40 in that a plurality of recessed flat rod portions 146 and recessed flat rod portions 148 are provided at circumferentially-spaced apart, or rotationally offset, positions on the rod 140. By providing such circumferentially-spaced and rotationally offset flat rod portions, the detent and self-propelling features discussed above in connection with FIGS. 1 through 6 are provided at more than one predetermined relative rotational orientation of the visor 22 and the sleeve portion 32 relative to the rod 140.

Thus, for example, such self-propelled and detented positions can be provided at predetermined relative rotational orientations corresponding with the visor 22 being positioned against the headliner of the vehicle interior 12, as shown in FIG. 1, as well as in a lowered position at which the visor 22 can shield the vehicle driver's eyes from the glare of the sun or from bright headlights from on-coming vehicles. It should be noted, as will be readily recognized by one skilled in the art, that any number of such predetermined relative rotational positions can be provided, with the only limitation being the amount of space available on the rod 140 for the recessed flat rod portions 146 and 148.

FIG. 9 diagrammatically illustrates still another application of a hinge assembly according to the present invention. In FIG. 9, a vehicle 210 includes an interior 212 with a visor 222 having a vanity assembly 216 thereon. The vanity assembly 216 includes a vanity door 217 pivotally interconnected with the visor 222 by a hinge assembly 226 according to the present invention. The hinge assembly 226 is merely shown in a diagrammatic manner in FIG. 9, but includes components that are correspondingly similar to those illustrated in FIGS. 1 through 8 and discussed above. One skilled in the art will readily recognize that certain elementary modifications to the elongated rods 40 or 140 discussed above may be necessary to adapt the present invention to such a vanity door application.

Similarly, as shown in FIG. 10, the principles of the present invention can also be applied in a vanity assembly 302 for pivotally interconnecting a vanity door 303 to the rear side of a head restraint 304 of a vehicle seat 305. It should be noted and emphasized that the alternate applications of the present invention shown diagrammatically in FIGS. 9 and 10, along with those shown in more detail in FIGS. 1 through 8, are merely exemplary embodiments and applications of a hinge assembly according to the present invention. One skilled in the art will readily recognize that the present invention is also advantageously applicable in non-vehicular installations.

The foregoing discussion discloses and describes exemplary embodiments of the present invention. One skilled in the art will readily recognize from such discussion, and from the accompanying drawings, that various changes, modifications and variations may be made therein without departing from the spirit and scope of the invention as defined in the following claims.

I claim:

1. A hinge assembly for pivotally interconnecting a first member with a second member, said hinge assembly comprising: an elongated rod member interconnected with the first member; a generally hollow elongated sleeve member having an interior surface and being interconnected with the second member for receiving said rod member for relative rotation therewithin; and resilient biasing means including a longitudinally-extending leaf spring in said sleeve member for resiliently biasing said rod member generally laterally against said interior surface of said sleeve member in order to provide a frictional relative rotational engagement between said rod member and said interior surface of said sleeve member, said leaf spring including at least one generally laterally-protruding discontinuity thereon, said discontinuity being generally laterally and resiliently compressed between said rod member and said interior surface of said sleeve member in order to bias said rod member in a generally lateral direction against said interior surface of said sleeve member, said rod member including at least one generally first flat rod portion thereon, said first flat rod portion being generally aligned longitudinally with said discontinuity on said leaf spring and being resiliently engaged by said discontinuity when said rod member is in a predetermined relative rotational orientation said sleeve member, said rod member having a second generally flat rod portion thereon, said sleeve member including a generally flat sleeve portion disposed on said interior surface and being separate from said leaf spring, said second flat rod portion being generally aligned longitudinally with said flat sleeve portion for mutual engagement with one another when said rod member is in a predetermined relative rotational orientation in said sleeve member, said resilient engagement of said leaf spring with said first flat rod portion and said mutual engagement of said flat sleeve portion with said second flat rod portion defining at least one detent in the relative rotation of said rod member in said sleeve member.

2. A hinge assembly according to claim 1, wherein said leaf spring is secured to said sleeve member in order to substantially prevent relative rotational movement of said leaf spring within said sleeve member.

3. A hinge assembly according to claim 1, wherein said flat rod portion is recessed generally laterally inwardly on said rod member, said discontinuity on said leaf spring protruding generally laterally inwardly toward said rod member, said discontinuity on said leaf spring being resiliently compressed between said rod member and said interior surface of said sleeve member to a lesser degree when said discontinuity engages said recessed flat rod portion than when said discontinuity engages non-recessed portions of said rod member in order to resiliently urge said rod member and said sleeve member into said predetermined relative rotational orientation when said rod member is relatively rotated to a second predetermined relative rotational orientation in relatively close rotational proximity with said first predetermined relative rotational orientation.

4. A hinge assembly for pivotally interconnecting a first member with a second member, said hinge assembly comprising: an elongated rod member interconnected with the first member; a generally hollow elongated sleeve member having an interior surface and being interconnected with the second member for receiving said rod member for relative rotation therewithin; and resilient biasing means including a longitudinally-extending leaf spring in said sleeve member for resiliently biasing said rod member generally laterally against said interior surface of said sleeve member in order to provide a frictional relative rotational engagement between said rod member and said interior surface of said sleeve member, said rod member including at least a first generally flat rod portion thereon, said sleeve member including at least one generally flat sleeve portion disposed on said interior surface and being separate from said leaf spring, said first flat rod portion being generally aligned longitudinally with said flat sleeve portion for mutual engagement with one another when said rod member is in a predetermined relative rotational orientation in said sleeve member, said mutual engagement defining a detent in the relative rotation of said rod member in said sleeve member at said predetermined relative rotational orientation.

5. A hinge assembly according to claim 4, wherein said resilient biasing means includes at least one generally laterallyprotruding discontinuity thereon, said discontinuity being generally laterally and resiliently compressed between said rod member and said interior surface of said sleeve member in order to bias said rod member in a generally lateral direction against said interior surface of said sleeve member, said rod member including at least a second generally flat rod portion thereon, said second flat rod portion being generally aligned longitudinally with said discontinuity on said resilient biasing means in order to be resiliently engaged by said discontinuity when said rod member is in said predetermined relative rotational orientation in said sleeve member.

6. A hinge assembly according to claim 5, wherein said second flat rod portion is recessed generally laterally inwardly on said rod member, said discontinuity on said resilient biasing member protruding generally laterally inwardly toward said rod member, said discontinuity being resiliently compressed between said rod member and said interior surface of said sleeve member to a lesser degree when said discontinuity engages said recessed second flat rod portion than when said discontinuity engages non-recessed portions of said rod member in order to resiliently urge said rod member and said sleeve member into said predetermined relative rotational orientation when said rod member is relatively rotated to a second predetermined relative rotational orientation in relatively close rotational proximity with said first rotational relative orientation.

7. A hinge assembly according to claim 6, wherein said flat sleeve portion is defined by at least one generally flat tab member at a fixed location on said interior surface of said sleeve member, said first flat rod portion being recessed generally laterally inwardly on said rod member to define an enlarged lateral clearance between said first flat rod portion and said interior surface of said sleeve member, said tab member being disposed within said enlarged lateral clearance when said rod member is in said first predetermined relative rotational orientation.

8. A visor hinge assembly for pivotally interconnecting a vehicle window visor with the interior of the vehicle, said visor hinge assembly comprising:
an elongated rod having an outer edge portion adapted to be interconnected with the interior of the vehicle and at least a pair of generally flat rod portions recessed generally laterally inwardly thereon;
a generally hollow elongated sleeve having an interior surface and being interconnected with the visor, said sleeve receiving said rod for relative rotation therewithin and having at least one generally flat sleeve portion on said sleeve interior surface, said flat sleeve portion being generally aligned longitudinally with a first of said flat rod portions for mutual engagement with one another when said rod and said sleeve are in a first predetermined relative rotational orientation; and
a longitudinally-extending leaf spring disposed within said sleeve separate from said flat sleeve portion and being resiliently deflected between said rod and said sleeve interior surface, said spring resiliently biasing said rod generally laterally against said sleeve interior surface in order to provide a frictional relative rotational engagement therebetween, said leaf spring having at least one generally V-shaped discontinuity thereon, the apex of said V-shaped discontinuity protruding in a generally laterally-inward direction to frictionally engage said rod, said V-shaped discontinuity being generally laterally and resiliently compressed between said rod and said sleeve interior surface, a second of said flat rod portions being generally aligned longitudinally with said V-shaped discontinuity in order to be resiliently engaged thereby when said rod and said sleeve are in said first predetermined relative rotational orientation, said V-shaped discontinuity being resiliently compressed between said rod and said sleeve interior surface to a lesser degree when said discontinuity engages said recessed second flat rod portion than when said discontinuity engages non-recessed portions of said rod in order to resiliently urge said rod and said sleeve into said first predetermined relative rotational orientation when said rod and said sleeve are relatively rotated to a second predetermined relative rotational orientation in relatively close rotational proximity to said first predetermined relative rotational orientation, said resilient engagement between said V-shaped discontinuity and said second flat rod portion coacting with said mutual engagement between said first flat rod portion and said flat sleeve portion to define a detent in the relative rotation of said rod in said sleeve at said first predetermined relative rotational orientation.

9. A visor hinge assembly according to claim 8, wherein said leaf spring includes a number of said V-shaped discontinuities, and wherein said rod includes a corresponding number of correspondingly longitudinally aligned second flat rod portions.

10. A visor hinge assembly according to claim 8, wherein said flat sleeve portion is defined by at least one generally flat tab member disposed at a fixed location on said sleeve interior surface on a generally opposite side of said rod from said leaf spring, said recessed first flat rod portion defining an enlarged lateral clearance between said first flat rod portion and said sleeve interior surface, said tab member being disposed within said enlarged lateral clearance when said rod and said sleeve are in said first predetermined relative rotational orientation.

11. A visor hinge assembly according to claim 10, wherein said flat sleeve portion is defined by a number of said generally flat tab members, each of said tab members having a tab end generally fixed to said sleeve interior surface and a free tab end protruding in a longitudinally inward direction relative to said sleeve, said tab members being generally laterally deflectable relative to said fixed tab end in order to allow said rod to be inserted longitudinally into said sleeve from a longitudinally outer end of said sleeve during assembly of said visor hinge assembly.

12. A visor hinge assembly according to claim 8, wherein said leaf spring has a first spring end generally fixedly anchored generally at an outer end of said sleeve, said leaf spring extending longitudinally inwardly within said sleeve from said first spring end.

13. A visor hinge assembly according to claim 12, wherein said rod has a laterally-inwardly tapered portion generally at its inner end, said leaf spring having a second opposite spring end extending in a generally laterally-inward direction relative to said interior surface of said sleeve, said second opposite spring end laterally engaging said tapered portion of said rod within said sleeve.

14. A visor hinge assembly for pivotally interconnecting a vehicle window visor with the interior of the vehicle, said visor hinge assembly comprising:
an elongated rod having an outer end portion adapted to be interconnected with the interior of the vehicle and at least two pairs of generally flat rod portions recessed generally laterally inwardly thereon;
a generally hollow elongated sleeve having an interior surface and being interconnected with the visor, said sleeve receiving said rod for relative rotation therewithin and having at least one generally flat sleeve portion on said sleeve interior surface, said flat sleeve portion being generally aligned longitudinally with a first of said flat rod portions for mutual engagement with said flat sleeve portion when said rod and said sleeve are in a first predetermined relative rotational orientation, said flat sleeve portion being generally aligned longitudinally with a second of said flat rod portions for mutual engagement with said flat sleeve portion when said rod and sleeve are in a second predetermined relative rotational orientation, said first and second predetermined relative rotational orientations being rotationally offset relative to one another; and
a longitudinally-extending leaf spring disposed within said sleeve separate from said flat sleeve portion and being resiliently deflected between said rod and said sleeve interior surface, said spring resiliently biasing said rod generally laterally against said sleeve interior surface in order to provide a frictional relative rotational engagement therebetween, said leaf spring having at least a pair of generally V-shaped discontinuities thereon, the apex of said V-shaped discontinuities protruding in a generally laterally-inward direction to frictionally engage said rod, said V-shaped discontinuities being generally laterally and resiliently compressed between said rod and said sleeve interior surface, a third of said flat rod portions being generally aligned longitudinally with a first of said V-shaped discontinuities in order to be resiliently engaged thereby when said rod and said sleeve are in said first predetermined relative rotational orientation, and a fourth of said flat rod portions being generally aligned longitudinally with a second of said V-shaped discontinuities in order to be resiliently engaged thereby when said rod and said sleeve are in said second predetermined relative rotational orientation, said V-shaped discontinuities being resiliently compressed between said rod and said sleeve interior surface to a lesser degree when said discontinuities engage their respective flat rod portions than when said discontinuities engage non-recessed portions of said rod in order to resiliently urge said rod and said sleeve into said first or said second predetermined relative rotational orientations when said rod and said sleeve are relatively rotated to predetermined relative rotational orientations that are in relatively close rotational proximity to respective ones of said first or second predetermined relative rotational orientations, said resilient engagement between said V-shaped discontinuities and said respective flat rod portions coacting with said mutual engagement between said respective first or second flat rod portions and said flat sleeve portion to define at least a pair of detents in the relative rotation of said rod in said sleeve at said respective first and second predetermined relative rotational orientations.

15. A visor hinge assembly according to claim 14, wherein said flat sleeve portion is defined by at least one generally flat tab member at a fixed location on said sleeve interior surface, said respective recessed first and second flat rod portions defining respective enlarged lateral clearances between said respective first and second flat rod portions and said sleeve interior surface, said tab members being disposed within said respective enlarged lateral clearances when said rod and said sleeve are in said respective first or second predetermined relative rotational orientations.

16. A visor hinge assembly according to claim 15, wherein said flat sleeve portion is defined by a number of said generally flat tab members, each of said tab members having a tab end generally fixed to said sleeve interior surface and a free tab end protruding in an inward direction relative to said sleeve, said tab members being generally laterally deflectable relative to said fixed tab end in order to allow said rod to be inserted longitudinally into said sleeve from a longitudinally outer end of said sleeve during assembly of said visor hinge assembly.

17. A visor hinge assembly according to claim 14, wherein said leaf spring has a first spring end generally fixedly anchored generally at an outer end of said sleeve, said leaf spring extending longitudinally inwardly within said sleeve from said first spring end.

18. A visor hinge assembly according to claim 17, wherein said rod has a laterally-inwardly tapered portion generally at its inner end, said leaf spring having a second opposite spring end extending in a generally laterally inward direction relative to said interior surface of said sleeve, said second opposite spring end laterally engaging said tapered portion of said rod within said sleeve.

* * * * *

UNITED STATES PATENT AND TRADEMARK OFFICE
CERTIFICATE OF CORRECTION

PATENT NO. : 4,821,374
DATED : April 18, 1989
INVENTOR(S) : James A. Gavagan

It is certified that error appears in the above-identified patent and that said Letters Patent is hereby corrected as shown below:

Column 3, line 15, "set" should be --seat--.

Column 6, line 55, claim 1, insert "in" after --orientation--.

Column 7, line 48, claim 5, insert "-" after --laterally--.

Column 8, line 23, claim 8, "edge" should be --end--.

Signed and Sealed this

Twentieth Day of November, 1990

Attest:

HARRY F. MANBECK, JR.

*Attesting Officer*  *Commissioner of Patents and Trademarks*